US011461283B2

(12) United States Patent
Avati et al.

(10) Patent No.: US 11,461,283 B2
(45) Date of Patent: Oct. 4, 2022

(54) MIGRATING FILE LOCKS IN DISTRIBUTED FILE SYSTEMS

(71) Applicant: Red Hat, Inc., Raleigh, NC (US)

(72) Inventors: Anand Avati, Mountain View, CA (US); Raghavendra Gowdappa, Karnataka (IN)

(73) Assignee: Red Hat, Inc., Raleigh, NC (US)

( * ) Notice: Subject to any disclaimer, the term of this patent is extended or adjusted under 35 U.S.C. 154(b) by 973 days.

(21) Appl. No.: 14/053,018

(22) Filed: Oct. 14, 2013

(65) Prior Publication Data

US 2015/0106411 A1  Apr. 16, 2015

(51) Int. Cl.
*G06F 17/00* (2019.01)
*G06F 7/00* (2006.01)
*G06F 16/182* (2019.01)

(52) U.S. Cl.
CPC ................. *G06F 16/182* (2019.01)

(58) Field of Classification Search
CPC .................................................. G06F 16/182
See application file for complete search history.

(56) References Cited

U.S. PATENT DOCUMENTS

| | | | | |
|---|---|---|---|---|
| 4,794,519 A | * | 12/1988 | Koizumi | H04L 67/325 707/827 |
| 4,825,354 A | * | 4/1989 | Agrawal | G06F 16/182 707/999.01 |
| 4,887,204 A | * | 12/1989 | Johnson | G06F 16/172 709/219 |
| 5,608,900 A | * | 3/1997 | Dockter | G06F 16/182 707/999.102 |
| 5,764,972 A | * | 6/1998 | Crouse | G06F 16/113 707/999.202 |
| 6,996,553 B2 | * | 2/2006 | Agrawal | H04L 47/20 707/999.1 |
| 7,243,089 B2 | | 7/2007 | Becker-Szendy et al. | |
| 7,406,473 B1 | | 7/2008 | Brassow et al. | |
| 7,774,364 B2 | | 8/2010 | Anderson et al. | |
| 8,352,658 B2 | | 1/2013 | Tarta et al. | |
| 2008/0243847 A1 | * | 10/2008 | Rasmussen | 707/8 |
| 2009/0119304 A1 | * | 5/2009 | Preslan et al. | 707/10 |
| 2010/0114849 A1 | | 5/2010 | Kingsbury et al. | |

(Continued)

FOREIGN PATENT DOCUMENTS

WO    2012068184    5/2012

OTHER PUBLICATIONS

Burns, Randal C. et al., "Consistency and Locking for Distributing Updates to Web Servers Using a Filing System," IBM Almaden Research Center, 7 pages.

(Continued)

*Primary Examiner* — Pavan Mamillapalli
(74) *Attorney, Agent, or Firm* — Lowenstein Sandler LLP (57) ABSTRACT

Systems and methods for migrating file locks in distributed file systems. An example method may comprise: receiving, by a file system server, over a first connection initiated by a file system client, a connection identifier comprising a file identifier; identifying, in view of the connection identifier, a second connection initiated by the file system client, the second connection associated with a file lock with respect to a file identified by the file identifier; and associating the file lock with the first connection.

20 Claims, 6 Drawing Sheets

(56) References Cited

U.S. PATENT DOCUMENTS

| | | | |
|---|---|---|---|
| 2010/0114889 A1* | 5/2010 | Rabii | G06F 16/1824 |
| | | | 707/737 |
| 2012/0066399 A1* | 3/2012 | Marquardt | H04L 69/162 |
| | | | 709/228 |
| 2012/0185437 A1 | 7/2012 | Pavlov et al. | |
| 2012/0284786 A1* | 11/2012 | Somani | H04L 63/0815 |
| | | | 726/7 |
| 2014/0122718 A1* | 5/2014 | Thoppai | G06F 17/30171 |
| | | | 709/225 |
| 2014/0325214 A1* | 10/2014 | Sadrolashrafi | 713/165 |

OTHER PUBLICATIONS

Patil, Swapnil et al., "Scale and Concurrency of GIGA+: File System Directories with Millions of Files," Carnegie Mellon University, 14 pages.

Eisler, Michael et al., "Data ONTAP GX: A Scalable Storage Cluster," Proceedings of FAST '07, a publication of USENIX, 2006, 14 pages.

Gansner, Emden R., "An Open Graph Visualization System and Its Applications to Software Engineering," AT&T Labs—Research, Software—Practice and Experience, Apr. 13, 1999, 29 pages.

Gowdappa, Raghavendra, "[Gluster-devel] RFC on Posix Lock Migration to New Graph After a Switch," Oct. 15, 2012, 3 pages.

\* cited by examiner

MIGRATING FILE LOCKS IN DISTRIBUTED FILE SYSTEMS

TECHNICAL FIELD

The present disclosure is generally related to computer systems, and is more specifically related to migrating file locks in distributed file systems.

BACKGROUND

In a distributed computer system, data objects (such as files) may be stored on a plurality of interconnected nodes in accordance with a storage architecture defining the data object placement and replication policies. The system efficiency and reliability may be significantly affected by the principles and design choices governing the storage architecture.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for migrating file locks in distributed file systems. In certain implementations, a distributed file system may be provided by a network attached storage (NAS) system comprising one or more server computer systems each coupled to one or more persistent data storage devices, such as magnetic or optical storage disks, solid-state drives (SSDs), etc. "Computer system" herein shall refer to a system comprising one or more processors, one or more memory devices, and one or more input/output (I/O) interfaces.

A server computer system may execute a file system server daemon to manage file input/output (I/O) requests originated by the file system clients. One or more client computer systems can execute a file system client daemon to communicate with one or more servers.

A file system client may request the file system configuration information from an external computer system (e.g., a file system server or a peer client). The file system configuration information may comprise the system topology information (e.g., the number of servers, the server connection information, replica relationships between the servers, etc.). Responsive to receiving the requested configuration information, the file system client may construct a configuration graph reflecting the distributed file system configuration. In an illustrative example, the file system configuration graph can be represented by a tree-like data structure comprising a root node corresponding to the file system mount point, two or more terminal ("leaf") nodes corresponding to the file system servers, and two or more intermediate nodes referred to as "translators." The translators may process I/O requests and responses traversing the graph, as described in more details herein below. Responsive to constructing the configuration graph, the file system client may create connections to the file system servers referenced by the leaf nodes of the graph.

The file system client may employ the file system configuration graph to process file access requests issued, e.g., by one or more applications executed by the client computer system. Each file access request may traverse the graph from the mount point to one or more leaf nodes via one or more translators. Responses corresponding to the file access requests may traverse the graph following the reverse route.

The distributed file system may support file locking. Responsive to opening a file, a file system client may issue a lock request with respect to at least a part of the file. "File locking" herein shall refer to a mechanism that restricts access to at least a part of the file to one or more processes for the duration of the lock.

When the distributed file system configuration is changed (e.g., a server is removed or a new server is added), a client may be notified of the change by one or more servers. Responsive to receiving a configuration change notification, the client may request the updated configuration information from a file system server and construct a new configuration graph. The client may then switch over to the new configuration graph by issuing, using the new configuration graph, file open requests with respect to the currently open files. The client may complete the switch-over process by closing the server connections that were opened using the old configuration graph.

A file server should be able to migrate the locks that the clients may have with respect to one or more files residing on the file server, from the connections opened by a particular client using the old configuration graph to the new connections opened by the same client using the new configuration graph. However, the file server generally has no means of correlating an incoming file open and lock request which is based on the new configuration file with an existing client connection which currently owns the file lock.

To address the above noted deficiency, the distributed file system server may implement a lock migration method described herein. In accordance with one or more aspects of the present disclosure, responsive to receiving a configuration change notification, a file system client may request, using the old configuration graph, specially constructed connection identifiers with respect to the files that are currently opened by the client from the servers on which the open files reside.

Responsive to receiving a connection identifier request, a file system server may issue a connection identifier comprising a unique identifier of the server, and identifiers of one or more files residing on the server and opened by the requesting client through the same connection that was employed to transport the connection identifier request. In certain implementations, the connection identifier may be encrypted by a secret key maintained by the issuing server.

The requesting client may collect connection identifiers from the file system servers on which the files opened by the client reside, and present the connection identifiers to the file servers referenced by the new configuration graph. Responsive to receiving the connection identifiers, a file system server may discard the connection identifiers which were not issued by the receiving server itself (e.g., by filtering the received connection identifiers based on the server identifier field, and/or the encryption key). With respect to each of the remaining connection identifiers, the file system server may identify the client which already has a connection and a lock on the file identified by the connection identifier, and transfer the ownership of the file lock to the new connection requested by the same client.

Various aspects of the above referenced methods and systems are described in details herein below by way of examples, rather than by way of limitation.

Figure 1:
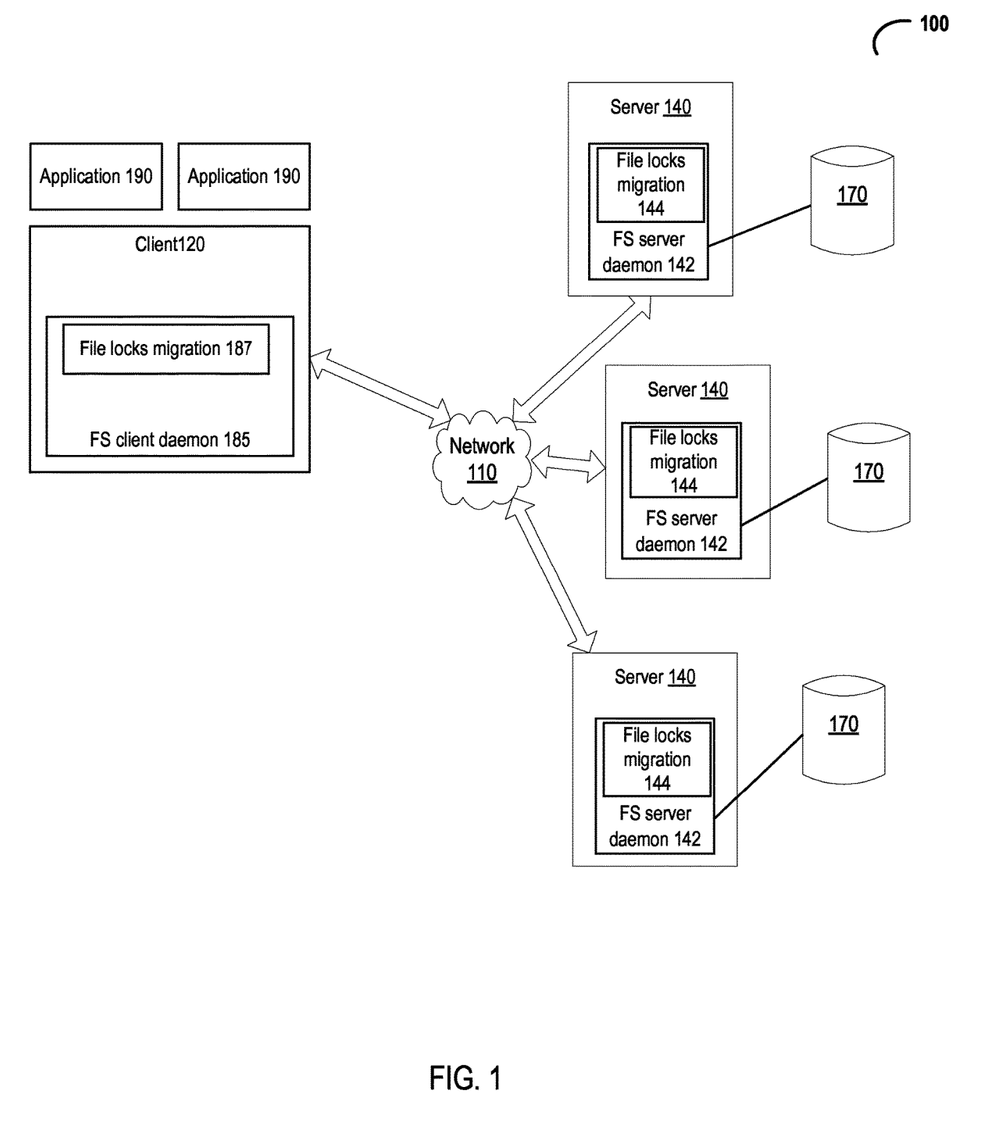
FIG. 1 schematically depicts component diagrams of example computer systems, in accordance with one or more aspects of the present disclosure.

FIG. 1 schematically depicts a high-level component diagram of an example distributed file system 100 in accordance with one or more aspects of the present disclosure. In certain implementations, distributed file system 100 may support data replication, load balancing, and other functions related to providing file system services.

Distributed file system 100 may include one or more servers 140 configured to individually and/or collectively service file access request (such as requests to create, access or modify a specified file). In an illustrative example of FIG. 1, each server 140 may include one or more data storage devices 170. "Data storage device" herein shall refer to a memory device, such as a disk, RAID array, EEPROM device, or any other device capable of storing data.

One or more client computers 120 may be communicatively coupled, e.g., over a network 110, to servers 140. Network 110 may be provided by one or more local area networks, one or more wide area networks, or any combination thereof. Client computer 120 may be provided by a computer system including a processor, a memory, and at least one communication interface (the above noted components of client computer 120 are omitted from FIG. 1). Client computer 120 can execute one or more applications 190.

Server 140 may run a file system server daemon (or any other component such as a module or program) 142 to export a local file system to clients 120 as a volume accessible by the clients. In certain implementations, file system server daemon 142 may comprise a file locks migration module 144 operating in accordance with one or more aspects of the present disclosure.

File system client daemon 185 running on client computers 120 may connect to servers via an application-level protocol implemented over TCP/IP, InfiniBand or other transports, and access multiple volumes exported by server 140 via one or more translators, as described in more details herein below. In certain implementations, file system client daemon 185 may comprise a file locks migration module 187 operating in accordance with one or more aspects of the present disclosure.

In certain implementations, distributed file system 100 may implement a file locking as a mechanism for managing access to shared files. Responsive to opening a file, a client may issue a lock request with respect to a least part of the file. In certain implementations, a lock request may be issued at the file, block, record, or byte level. In illustrative examples, the whole file, one or more blocks of the file, one or more records of the file, or a part of the file identified by the starting byte address and the size, may be locked. In a further illustrative example, an exclusive lock request may be issued to restrict access to at least a part of the file to only one process for the duration of the lock.

To locally mount a distributed file system volume, a file system client may request the file system configuration information from an external computer system (e.g., a file system server or a peer client). Responsive to receiving the requested configuration information, the file system client may construct a configuration graph reflecting the distributed file system configuration and the corresponding translator configuration.

Figure 2:
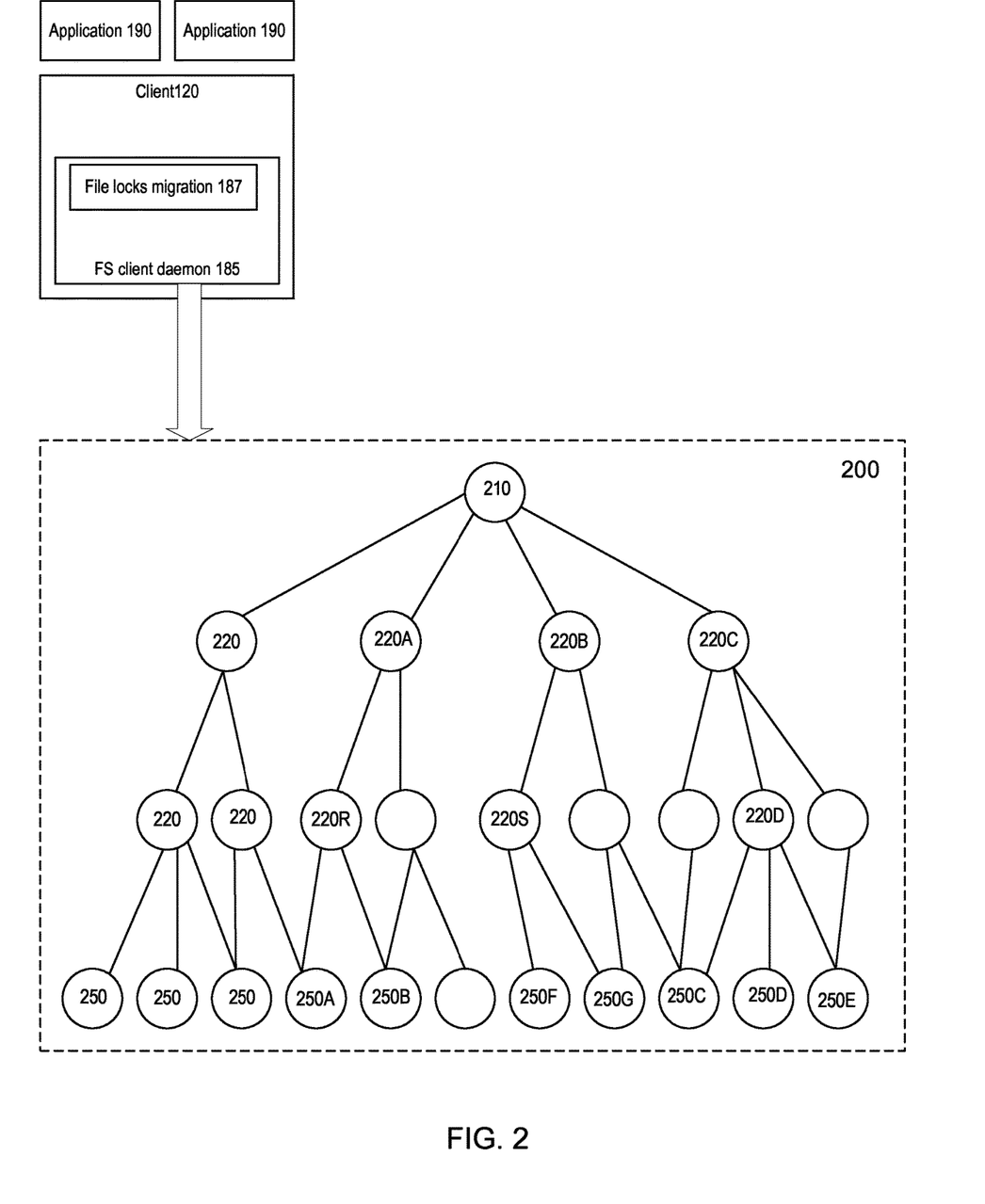
FIG. 2 schematically illustrates a distributed file system configuration graph, in accordance with one or more aspects of the present disclosure.

As schematically illustrated by FIG. 2, a file system configuration graph 200 can be represented by a hierarchical data structure comprising a set of linked nodes. In certain implementations, file system configuration graph 200 may be represented by a tree comprising a root node 210 corresponding to the file system mount point, two or more leaf nodes 250 corresponding to the file system servers, and two or more intermediate nodes 220 also referred to as "translators." The translators may process I/O requests and responses traversing the graph, as described in more details herein below. Responsive to constructing the configuration graph, the file system client may create connections to the file system servers 140 referenced by the leaf nodes of the graph, thus completing the file system mounting process.

The client may employ the configuration graph to process file access requests issued by applications executed by the client computer system. Each file access request may traverse the graph from the mount point to one or more leaf nodes via one or more translators. Responses corresponding to the file access requests may traverse the graph following the reverse route.

In an illustrative example, a replicate translator 220R may receive a write request from its parent node 220A and perform corresponding write operations on two or more of its child nodes 250A-250B. In another illustrative example, a distribute translator 220D may receive a write request from its parent node 220C and select, among its child nodes 250C-250E, a node to perform the corresponding write operation. In a further illustrative example, a stripe translator 220S may receive a write request from its parent node 220B and split the write request into two or more write requests to be processed by two or more child nodes 220E-220G.

The configuration of distributed file system 100 may be changed by adding or removing servers, migrating files and/or volumes, adding or migrating replicas of a file, etc. In certain implementations, clients may be notified of file system configuration changes, e.g., by a file system server. Alternatively, the client may periodically or responsive to a certain event request configuration updates from a file system server and/or from a peer client.

Responsive to receiving a configuration change notification or otherwise determining that the file system configuration has been changed, the client may request the updated configuration information from a file system server or from a peer client. Based on the updated configuration information reflecting the new file system configuration, the client may construct a new configuration graph, and establish connections with the servers referenced by the leaf nodes of the new configuration graph. The connections established to the servers referenced by the leaf nodes of the previous configuration graph may be terminated by either the client or the respective servers.

A plurality of files opened by the client may reside on one or more servers of the distributed file system at the time of the configuration change. The client may have locks on at least some of the open files. With respect to any given server, a connection to the server established by the client based on the previous configuration graph is replaced, as a part of the configuration update process, with a connection to the server established by the same client based on the new configuration graph. As noted herein above, the server should be able to correlate the two connections and to transfer the ownership of the file locks to the newly established connection.

Figure 3:
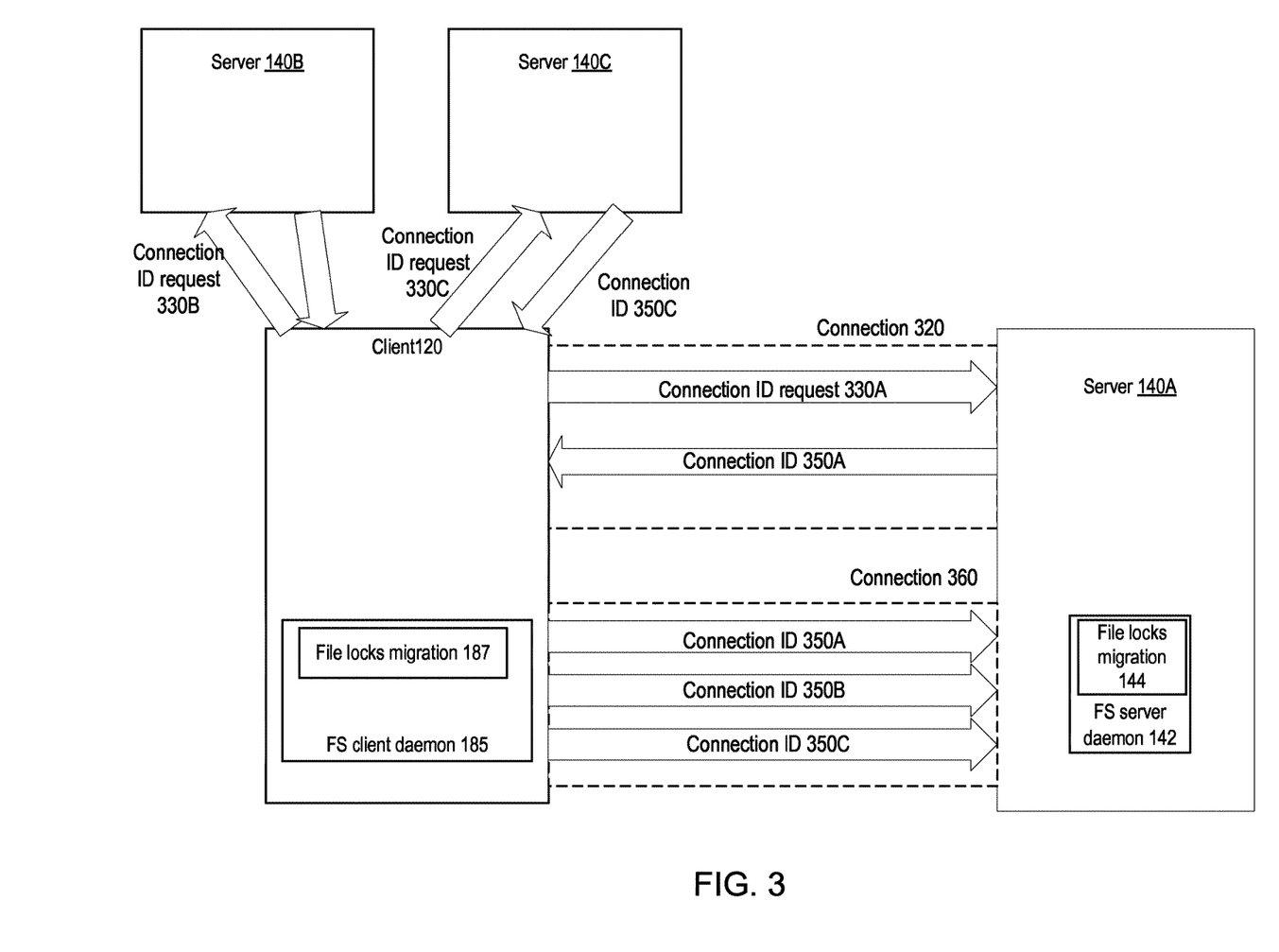
FIG. 3 schematically illustrates migrating file locks in distributed file systems, in accordance with one or more aspects of the present disclosure.

In order to facilitate the file locks migration by the file system server, the server may issue connection identifiers with respect to the open connections, as described herein below with references to FIG. 3. File system client 120 may transmit, over connections 320 opened using the old configuration graph, connection identifier requests 330A-330C to one or more file servers 140A-140C on which the files reside that have been previously opened by the client. Responsive to receiving a connection identifier request, each server may issue a connection identifier 350 comprising a unique identifier of the issuing server, and identifiers of one or more files residing on the server and opened by the requesting client through the same connection that was employed to transport the connection identifier request. The server identifier may be generated by the server and may be represented, e.g., by a bit sequence generated by a random number generator. In certain implementations, the server identifier may be represented by a 128-bit Global Unique Identifier (GUID).

In certain implementations, the connection identifier may be encrypted using a secret encryption key maintained by the issuing server. The encryption key may be generated by the server and may be represented, e.g., by a bit sequence generated by a random number generator.

The requesting client may receive connection identifiers from the file system servers on which the files opened by the client reside, and present the plurality of connection identifiers to each file server referenced by the new configuration graph.

Responsive to receiving the connection identifiers transmitted by client 120 over a newly established connection 360, server 140A may discard the connection identifiers which were not issued by the receiving server 140A itself (e.g., by filtering the received connection identifiers based on the server identifier field, and/or the encryption key). With respect to each of the remaining one or more connection identifiers, server 140A may identify the corresponding previously established connection 320 as the connection over which the respective connection identifiers have been previously transmitted by the server in response to the connection identifier request. Thus, the server may correlate the newly established connection 360 and existing connection 320, based on the connection identifiers transmitted by the client. Responsive to correlating the newly established connection (i.e., the connection over which the connection identifier was received to the client) and an existing connection (i.e., the connection over which the same connection identifier has been previously sent to the client), the server may transfer to new connection 360 the ownership of the file locks with respect to one or more files identified by the connection identifier.

The connections that have been opened by the client to one or more file system servers using the old configuration graph may be terminated either by the client or by the respective servers. The client may complete the configuration change process by discarding the old configuration graph.

Figure 4:
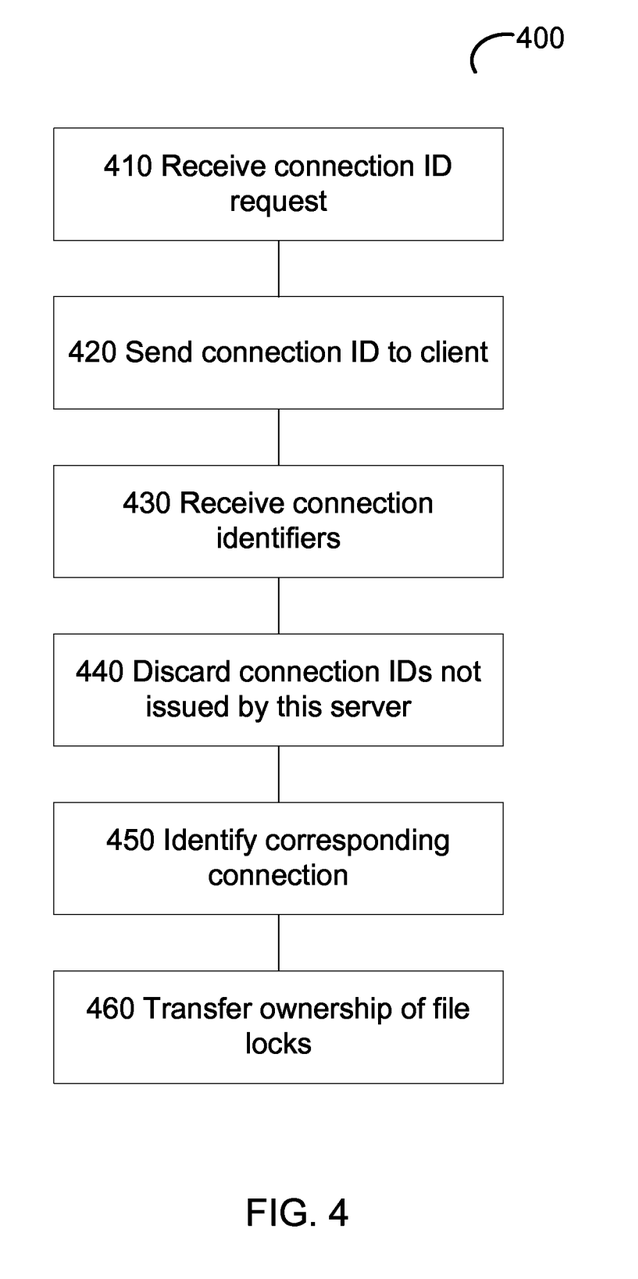
FIGS. 4-5 depict flow diagrams of example methods for migrating file locks in distributed file systems, in accordance with one or more aspects of the present disclosure.

FIG. 4 depicts a flow diagram of an example method 400 performed by a distributed file system server for migrating file locks. Method 400 and/or each of its individual functions, routines, subroutines, or operations may be performed by one or more processors of the computer system (e.g., file server 140 of FIG. 1) executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, a file system server may receive, over a first connection initiated by a file system client, a connection identifier request from a file system client that has one or more open files residing on the server.

At block 420, the server may send the connection identifier to the requesting file system client. As noted herein above, the connection identifier may comprise a unique identifier of the server, and identifiers of one or more files residing on the server and opened by the requesting client. In certain implementations, the connection identifier may be encrypted by a secret key maintained by the issuing server.

At block 430, the server may receive, over a second connection initiated by the file system client, a plurality of connection identifiers.

At block 440, the server may discard the connection identifiers which were not issued by the receiving server itself (e.g., by filtering the received connection identifiers based on the server identifier field), as described in more details herein above.

At block 450, the server may, for each remaining connection identifier, identify a corresponding previously established connection, as the connection over which the respective connection identifiers have been previously transmitted by the server in response to the connection identifier request, as described in more details herein above.

At block 460, the server may transfer to second connection the ownership of the file locks with respect to one or more files identified by the connection identifier. Upon completing the operations referenced by block 460, the method may terminate.

Figure 5:
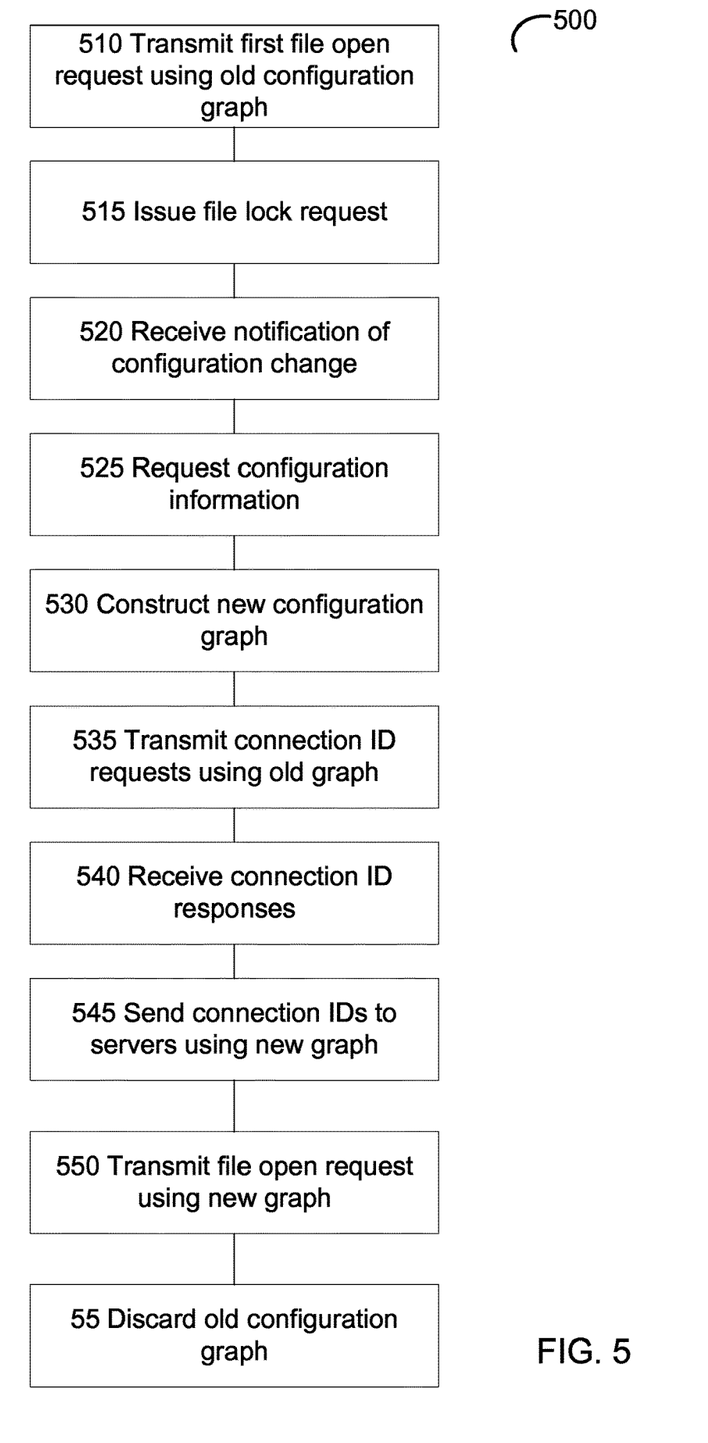

FIG. 5 depicts a flow diagram of an example method 500 performed by a distributed file system client for migrating file locks. Method 500 and/or each of its individual functions, routines, subroutines, or operations may be performed by one or more processors of the computer system (e.g., file system client 120 of FIG. 1) executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other.

At block 510, a distributed file system client may transmit, based on a first configuration graph describing the configuration of the distributed file system, a first open request with request to a file.

At block 515, the client may issue a lock request with respect to at least a part of the file, as described in more details herein above.

At block 520, the client may receive a notification of a configuration change in the distributed file system. In certain implementations, clients may be notified of file system configuration changes, e.g., by a file system server. Alternatively, the client may periodically or responsive to a certain event request configuration updates from a file system server and/or from a peer client.

At block 525, the client may request, from a file system server or from a peer client, configuration information describing the updated configuration of the distributed file system.

At block 530, the client may construct and store in its memory the second configuration graph describing the updated configuration of the distributed file system, as described in more details herein above.

At block 535, the client may transmit, based on the first configuration graph, connection identifier requests to a plurality of servers of the distributed file system.

At block 540, the client may receive a plurality of responses from the file system servers. Each response may comprise a connection identifier constructed by the respective file system server, as described in more details herein above.

At block 545, the client may send the received set of connection identifiers to the servers referenced by the leaf nodes of the second configuration graph, as described in more details herein above.

At block 550, the client may transmit, based on the second configuration graph, file open requests with respect to the files that have previously been opened by the client using the first configuration graph.

At block 555, the client may discard the first configuration graph. Upon completing the operations referenced by block 555, the method may terminate.

Figure 6:
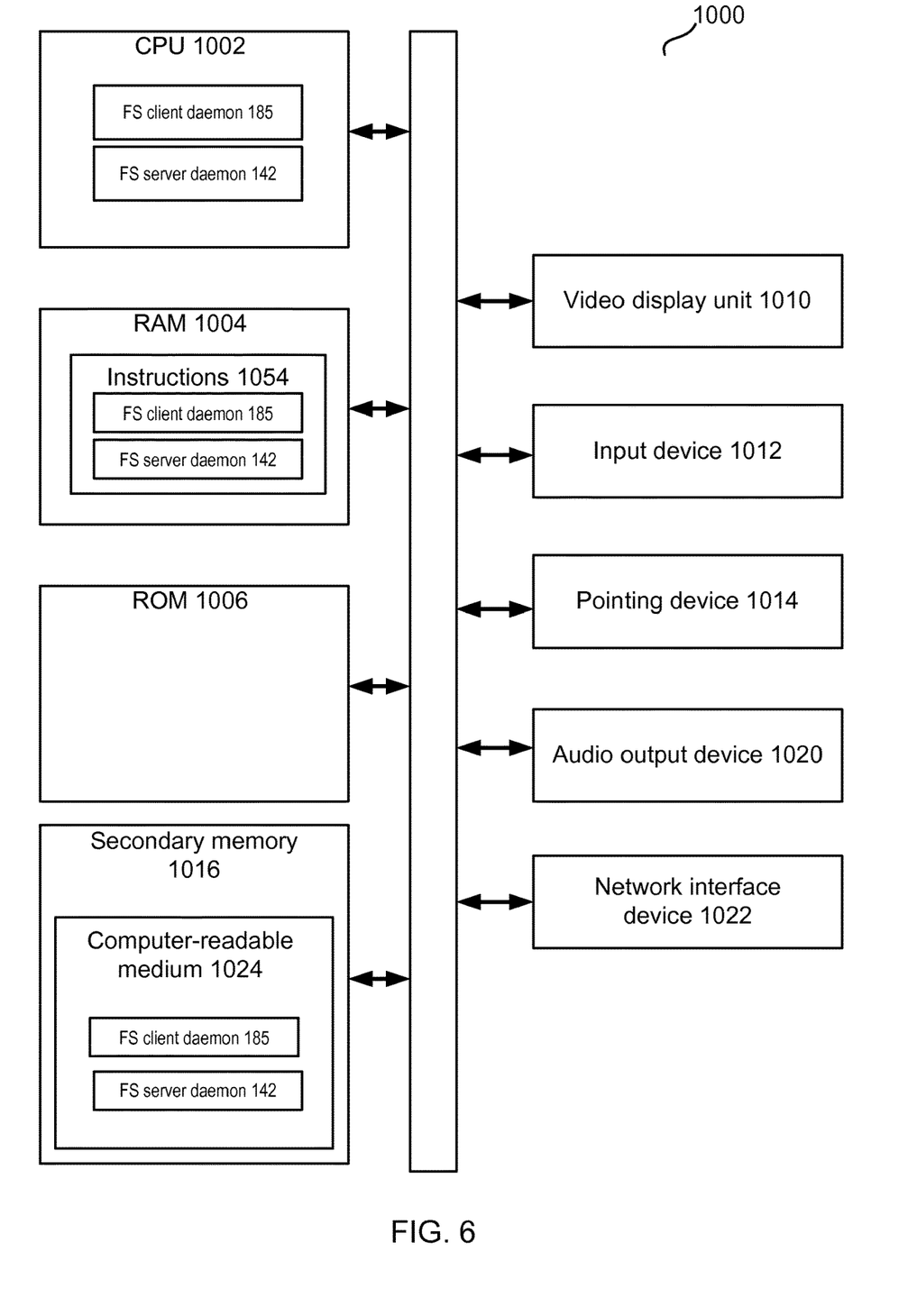
FIG. 6 depicts an illustrative computer system operating in accordance with one or more aspects of the present disclosure.

FIG. 6 depicts an illustrative computer system operating in accordance with examples of the present disclosure. In illustrative examples, computer system 1000 may correspond to file system server 140 or file system client 120 of FIG. 1.

In one example, computer system 1000 may be connected (e.g., via a network, such as a Local Area Network (LAN), an intranet, an extranet, or the Internet) to other computer systems (e.g., other nodes). Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, computer system 1000 may include a processor 1002, a volatile memory 1004 (e.g., random access memory (RAM)), a non-volatile memory 1006 (e.g., read-only memory (ROM) or electrically-erasable programmable ROM (EEPROM)), and a storage memory 1016 (e.g., a data storage device), which may communicate with each other via a bus 1008.

Processor 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

In an illustrative example, secondary memory 1016 may include a tangible computer-readable storage medium 1024 on which may be stored instructions 1054 encoding file system server daemon 142 implementing method 400 for migrating file locks by a distributed file system server. In another illustrative example, secondary memory 1016 may include a tangible computer-readable storage medium 1024 on which may be stored instructions 1054 encoding file system client daemon 185 implementing method 500 for migrating file locks by a distributed file system client. Instructions 1054 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 400 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The invention claimed is:

1. A method, comprising:
receiving, by a processor of a file system server, over a first connection, a connection identifier request initiated by a file system client;
generating a first connection identifier comprising a server identifier of the file system server and identifiers of a plurality of files that were previously opened by the file system client over the first connection, wherein a file of the plurality of files has a file lock associated with the first connection;
transmitting, over the first connection, the first connection identifier;
receiving, by the processor, over a second connection, a plurality of connection identifiers;
responsive to determining, in view of respective server identifier fields of one or more connection identifiers of the plurality of connection identifiers, that the one or more connection identifiers of the plurality of connection identifiers were not previously issued by the file system server, discarding the one or more connection identifiers;
identifying, among remaining connection identifiers of the plurality of connection identifiers, a second connection identifier that matches the first connection identifier; and
transferring, by the processor, the file lock to the second connection.

2. The method of claim 1, wherein receiving the second connection identifier comprises decrypting the second connection identifier using a secret key stored by the file system server.

3. The method of claim 1, wherein generating the first connection identifier further comprises:
encrypting the first connection identifier using a secret key stored by the file system server.

4. The method of claim 3, wherein determining that the one or more connection identifiers of the plurality of connection identifiers are not associated with were not previously issued by the file system server further comprises:
filtering the plurality of connection identifiers based on the secret key.

5. The method of claim 3, further comprising:
generating, using a random number generator, the secret key.

6. The method of claim 1, further comprising:
terminating the first connection.

7. The method of claim 1, wherein the file lock applies to a part of the file, and wherein the part of the file is identified by a starting byte address and a size.

8. The method of claim 1, further comprising:
generating, using a random number generator, the server identifier.

9. The method of claim 1, wherein the server identifier is represented by a global unique identifier.

10. The method of claim 1, further comprising:
responsive to receiving a file system configuration request, transmitting a file system configuration information to the client.

11. The method of claim 10, wherein the file system configuration information is described by a configuration graph comprising a root node representing a file system mount point and further comprising a plurality of terminal nodes representing a plurality of file system servers.

12. A system, comprising:
a memory; and
a processor, operatively coupled to the memory, to:
receive, over a first connection, a connection identifier request initiated by a file system client;
generate a first connection identifier comprising a server identifier of a file system server and identifiers of a plurality of files that were previously opened by the file system client over the first connection, wherein a file of the plurality of files has a file lock associated with the first connection;
transmit, over the first connection, the first connection identifier;
receive over a second connection, a second plurality of connection identifiers;
responsive to determining, in view of respective server identifier fields of one or more connection identifiers of the plurality of connection identifiers, that the one or more connection identifiers of the plurality of connection identifiers were not previously issued by the file system server, discard the one or more connection identifiers;
identify, among remaining connection identifiers of the plurality of connection identifiers, a second connection identifier that matches the first connection identifier; and
associate the file lock with the second connection.

13. The system of claim 12, wherein to associate the file lock with the second connection, the processor is further to disassociate the lock from the first connection.

14. The system of claim 12, wherein the connection identifier further comprises an identifier of a file system server.

15. The system of claim 12, wherein generating the first connection identifier further comprises:
encrypting the first connection identifier using a secret key stored by the file system server.

16. The system of claim 12, wherein the processor is further to:
terminate the first connection.

17. A non-transitory computer-readable storage medium comprising executable instructions that, when executed by a processor of a file system server, cause the processor to:
receive, by the processor, over a first connection, a connection identifier request initiated by a file system client;
generate a first connection identifier comprising a server identifier of the file system server and identifiers of a plurality of files that were previously opened by the file system client over the first connection, wherein a file of the plurality of files has a file lock associated with the first connection;

transmit, over the first connection, the first connection identifier;

receive, by the processor, over a second connection, a second plurality of connection identifiers;

responsive to determining, in view of respective server identifier fields of one or more connection identifiers of the plurality of connection identifiers, that the one or more connection identifiers of the plurality of connection identifiers were not previously issued by the file system server, discard the one or more connection identifiers;

identify, among remaining connection identifiers of the plurality of connection identifiers, a second connection identifier that matches the first connection identifier; and associate, by the processor, the file lock with the second connection.

18. The non-transitory computer-readable storage medium of claim 17, wherein the executable instructions to cause the processor to associate the file lock with the second connection further comprise executable instructions to cause the processor to disassociate the lock from the first connection.

19. The non-transitory computer-readable storage medium of claim 17, wherein generating the first connection identifier further comprises:

encrypting the first connection identifier using a secret key stored by the file system server.

20. The non-transitory computer-readable storage medium of claim 17, further comprising executable instructions that, when executed by the processor, cause the processor to:

terminate the first connection.

\* \* \* \* \*